(12) United States Patent
Pagelsen et al.

(10) Patent No.: US 10,295,274 B2
(45) Date of Patent: May 21, 2019

(54) HEAT EXCHANGE SYSTEM WITH A COOLING DEVICE AND METHOD FOR EXCHANGING HEAT BY USING THE HEAT EXCHANGE SYSTEM

(71) Applicant: Siemens Aktiengesellschaft, München (DE)

(72) Inventors: Niels Pagelsen, Hamburg (DE); Jennifer Verena Wagner, Hamburg (DE)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

(21) Appl. No.: 15/805,183

(22) Filed: Nov. 7, 2017

(65) Prior Publication Data

US 2018/0142963 A1    May 24, 2018

(30) Foreign Application Priority Data

Nov. 23, 2016 (DE) .................. 10 2016 223 205

(51) Int. Cl.
*F28D 7/02* (2006.01)
*F28D 20/00* (2006.01)

(52) U.S. Cl.
CPC ..... *F28D 20/0043* (2013.01); *F28D 20/0056* (2013.01); *Y02E 60/142* (2013.01)

(58) Field of Classification Search
CPC ... F28D 20/0043; F28D 20/0056; F28F 13/06

(Continued)

(56) References Cited

U.S. PATENT DOCUMENTS

| 4,294,600 A * | 10/1981 | Sarcia ............... F25B 9/14 137/625.37 |
| 2008/0016866 A1 | 1/2008 | Mohr |
| 2017/0261268 A1 | 9/2017 | Barmeier et al. |

FOREIGN PATENT DOCUMENTS

| CN | 101903713 A | 12/2010 |
| CN | 103075906 A | 5/2013 |

(Continued)

OTHER PUBLICATIONS

European Extended Search Report dated Mar. 15, 2018; Application No. 17194876.3.

(Continued)

*Primary Examiner* — Davis D Hwu
(74) *Attorney, Agent, or Firm* — Schmeiser, Olsen & Watts, LLP

(57) ABSTRACT

A heat exchange system with at least one horizontal heat exchange chamber with heat exchange chamber boundaries which surround at least one heat exchange chamber interior of the heat exchange chamber is provided. The heat exchange chamber boundaries include at least one first opening for guiding in an inflow of at least one heat transfer fluid into the heat exchange chamber interior and at least one second opening for guiding out an outflow of the heat transfer fluid out of the heat exchange chamber interior. At least one heat storage material is arranged in the heat exchange chamber interior such that a heat exchange flow of the heat transfer fluid through the heat exchange chamber interior causes a heat exchange between the heat storage material and the heat transfer fluid. The heat exchange chamber is located at a soil area of a soil.

13 Claims, 2 Drawing Sheets

(58) Field of Classification Search
USPC .......................................................... 165/10
See application file for complete search history.

(56) References Cited

FOREIGN PATENT DOCUMENTS

| | | |
|---|---|---|
| CN | 203750560 U | 8/2014 |
| DE | 2721173 A1 | 11/1978 |
| DE | 29824479 U1 | 3/2001 |
| DE | 102005001347 A1 | 7/2006 |
| DE | 202010015153 U1 | 3/2011 |
| DE | 202012103544 U1 | 12/2013 |
| EP | 0012037 A1 | 6/1980 |
| GB | 2532485 A | 5/2016 |
| JP | S4964008 A | 6/1974 |
| WO | WO 2016050367 A1 | 4/2016 |

OTHER PUBLICATIONS

Non-English Chinese Office Action dated Mar. 20, 2019 for Application No. 201711182269.6.

* cited by examiner

HEAT EXCHANGE SYSTEM WITH A COOLING DEVICE AND METHOD FOR EXCHANGING HEAT BY USING THE HEAT EXCHANGE SYSTEM

CROSS-REFERENCE TO RELATED APPLICATIONS

This application claims priority to German application No. DE 10 2016 223 205.3 having a filing date of Nov. 23, 2016, the entire contents of which are hereby incorporated by reference.

FIELD OF TECHNOLOGY

The following refers to a heat exchange system with a cooling device and a method for exchanging heat by using the heat exchange system.

BACKGROUND

For instance, the energy exchange system is an energy storage system. Energy storage systems play an important role in an improvement of a stability of power supply networks. Sensible thermal exchange systems are state of the art for storing fluctuating energy from renewable sources.

Electrical excess energy from a main supply grid is transformed into heat (thermal energy) and is stored in heat storage material of a heat exchange chamber of the heat exchange system.

In times with no or low occurrence of wind, the stored thermal energy is used for generating steam to produce electrical energy over a steam turbo generator and the produced electricity is fed in the main supply grid.

Sensible energy storage can be realized for example by heating up a solid thermal storage material like stones or gravel. The material is heated up and kept at high temperature levels over a long period of time.

Storing large amounts of energy for grid balancing requires large quantities of solid storage material with a heat capacity in the magnitude of 1 kJ/kg K.

The storage material needs to be founded on the ground. Therefore, the soil is heated up by through an insulation to the ground. Heat is transferred to the soil. This leads to two areas of problems. The first being a legal problem: it is generally not allowed to heat the groundwater more than a couple of degree Kelvin in Germany. The second being a design problem: materials have to be suitable to the prevailing temperature.

State of the art is thermal insulation and use of temperature resistant materials for sensible heat storages. This is possible since most of the state of the art sensible heat storages do not hold very high temperature levels, whereas heat storages used in combination with a conventional steam cycle need to store heat at very high temperatures. Alternatively, the storage can be cooled down completely after every single cycle. This leads to high losses of energy since low temperature heat cannot be recycled (in a closed loop) in the following charging cycle.

SUMMARY

An aspect relates to a high temperature heat exchange system with reduced thermal stress for the ground on which a heat exchange chamber of the heat exchange system is located.

A heat exchange system with at least one horizontal heat exchange chamber with heat exchange chamber boundaries which surround at least one heat exchange chamber interior of the heat exchange chamber is provided. The heat exchange chamber boundaries comprise at least one first opening for guiding in an inflow of at least one heat transfer fluid into the heat exchange chamber interior and at least one second opening for guiding out an outflow of the heat transfer fluid out of the heat exchange chamber interior. At least one heat storage material is arranged in the heat exchange chamber interior such that a heat exchange flow of the heat transfer fluid through the heat exchange chamber interior causes a heat exchange between the heat storage material and the heat transfer fluid. The heat exchange chamber is located at a soil area of a soil. At least one cooling device is arranged between the heat exchange chamber and the soil for inhibiting a heat transfer from the heat exchange chamber to the soil. Preferably, the heat exchange chamber is located on the soil area and the cooling device is located beneath the heat exchange chamber.

In addition to the heat exchange system, a method for exchanging heat by using the heat exchange system is provided. Thereby, in an operating mode of the heat exchange system a heat exchange flow of heat transfer fluid is guided through the heat exchange chamber interior, whereby a heat exchange between the heat storage material and the heat transfer fluid is caused. The operating mode is selected from the group consisting of charging mode with a heat transfer from the heat transfer fluid to the heat storage material and a discharging mode with a heat transfer from the heat storage material to the heat transfer fluid.

In general it is possible to control the heat transmission from the heat exchange system to the environment. Therefore, by applying such a cooling system the temperature distribution inside the heat exchange system can be influenced as well as soil temperature can be controlled or certain components, e.g. foils for airtightness of the heat exchange chamber or concrete as a supporting structure can be protected from overheating.

The heat exchange chamber is a space, cavity or a housing in which the heat storage material is located. Inside of the heat exchange chamber the heat exchange takes place. The heat storage material comprises preferably sand and/or stones. In addition, the heat transfer fluid comprises preferably a gas at ambient gas pressure. The gas at ambient gas pressures is preferably air.

The heat transfer fluid is guided (led) into the heat exchange chamber interior via the first opening and is guided out of the heat exchange chamber interior via the second opening. The first opening of the heat exchange chamber boundaries is an inlet opening. The second opening of the heat exchange chamber boundaries is an outlet opening. Thus, there are different areas of the heat exchange chamber boundaries, namely an inlet area of the heat exchange chamber boundaries with the first opening and an outlet area of the heat exchange chamber boundaries with the second opening.

The term "horizontal heat exchange chamber" implies a horizontal main (average) flow of the heat transfer fluid through the heat exchange chamber interior. The flow direction of the horizontal main flow is essentially parallel to the average surface of the earth. The horizontal direction is essentially a perpendicular direction to the direction of the gravity force which affects the heat transfer fluid. Perpendicular means in this context that deviations from the perpendicularity of up to 20° and preferably deviations of up to 10° are possible.

A horizontally oriented direction of the heat exchange flow can be achieved by laterally arranged first openings and/or lateral second openings. The horizontal heat exchange chamber comprises these openings in its side heat exchange chamber boundaries. In addition, with the aid of an active fluid motion device like a blower or a pump the heat exchange flow in the heat exchange chamber interior is caused. The heat transfer fluid is blown or pumped into the heat exchange chamber interior or is pumped or sucked out of the heat exchange chamber interior.

In contrast to the term "horizontal heat exchange chamber", the term "vertical heat exchange chamber" implies a vertical main flow of the heat transfer fluid through the heat exchange chamber interior.

The operating mode of the heat exchange system is selected from the group consisting of charging mode with a heat transfer from the heat transfer fluid to the heat storage material and discharging mode with a heat transfer from the heat storage material to the heat transfer fluid.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposed to each other (countercurrent operation). But, a change of the directions of the heat exchange flow is not necessary. Charging mode direction and discharging mode direction comprise the same direction (co-current operation).

In countercurrent operation, switching from the charging mode to the discharging mode the direction of the heat exchange flow through the heat exchange chamber interior is reversed and consequently, the function of the openings (inlet opening, outlet opening) is reversed, too. With such a solution it is especially advantageous to use the same heat transfer fluid for the charging mode and for the discharging mode. But of course, different heat transfer fluids for the charging mode and the discharging mode can be used, too.

For the charging mode, the heat exchange system is equipped with at least one charging unit for heating the heat transfer fluid. In the charging mode with activated charging unit, the charging unit can be located upstream of the heat exchange chamber. In contrast to that, in the discharging mode with a deactivated charging unit, the charging unit can be located downstream of the heat exchange chamber.

Preferably, the charging unit comprises at least one electrical heating device which is selected from the group consisting of resistance heater, inductive heater, emitter of electromagnetic radiation and heat pump. The electromagnetic radiation is preferably infrared radiation. A combination of different electrical heating devices is possible. With the aid of the electrical heating devices electricity is transformed into heat. This heat is absorbed by the heat transfer fluid and transported to the heat storage material in the heat exchange chamber interior.

In a preferred embodiment, the soil area is formed by at least one soil excavation of the soil. The heat exchange chamber is at least partly arranged in at least one soil excavation of the soil. By that it is possible that at least one the heat exchange chamber boundaries is at least partly formed by at least one soil boundary.

In a preferred embodiment, the cooling device comprises at least one piping system with at least one cooling duct for piping at least one cooling fluid. The cooling fluid (gaseous or liquid) can be guided through the cooling duct.

For instance, the cooling fluid is (liquid) water or (gaseous) air. These cooling fluids are cheap, in many areas of the world available without restrictions and environmentally friendly.

In order to enhance the cooling capacity of the cooling device it is advantageous to use additional heat absorbing materials. In a preferred embodiment, the cooling device comprises at least one solid heat absorbing material. Preferably, the solid heat absorbing material comprises sand. Thereby it is advantageous to use wet sand (In this case, the cooling fluid is water).

In a preferred embodiment, the piping system comprises at least one open piping cycle and/or at least one closed piping cycle. Preferably, the piping system comprises at least one parallel arrangement of at least two of the piping cycles and/or a serial arrangement of at let two of the piping cycles. The piping cycles are arranged parallel and/or in series.

The piping system can be a closed system with one or more parallel or serial or a combination of both circles. Serial circles meaning that one circle is directly connected to the storage. Whereas in a parallel setup all circles are connected with the storage. In a closed system a heat exchanger is needed to cool down the medium. After cooling the medium is used again and pumped through the piping system. If more than one serial circle is used, a heat exchanger is needed to thermally couple the circles. In this setup the medium is not lost and is used for an endless amount of cycles. Whereas the cooling fluid in a closed circle is not leaked, chemicals or polluted water could be used. In an open system where air is used as medium the air can be sucked through the pipes via a small sized blower.

In order to adjust the cooling procedure the piping system is equipped with at least one flow adjusting element for adjusting a flow of the cooling fluid trough the piping system. Preferably, the flow adjusting element comprises at least one active fluid motion device which is selected from the group consisting of blower, fan and pump and/or the flow adjusting element comprises at least one passive fluid control device which is selected from the group consisting of activatable bypass pipe, nozzle, flap, damper and valve. A multitude of these devices are possible as well as a combination of these devices. In addition, flow adjusting elements can be arranged serially or in parallel.

Preferably, the heat exchange system according is equipped with at least one discharging unit for discharging the heat transfer fluid of the outflow from heat for production of electricity. The discharging unit comprises at least one steam cycle.

The heat exchange system is preferably a high temperature heat exchange system. So, thermal energy can be stored at high temperatures. So, an operating temperature of the operating mode is preferably selected from the range between 300° C. and 1000° C., more preferably selected from the range between 500° C. and 1000° C., more preferably selected from the range between 600° C. and 1000° C. and 650° C. to 1000° C. and most preferably selected from the range between 700° C. and 1000° C.

The above mentioned problem is addressed by the integration of a cooling system for the volume between the soil and the heat exchange chamber. The cooling system consists of a cooling medium (cooling fluid), piping and a source for the cooling medium.

The piping system can be an input or injection system, where the medium is pumped in the volume that is to be cooled. For example, water can be pumped into the medium—which can be sand for instance—beneath the storage. Wet sand has a better thermal conductivity than dry sand. This not only cools down the volume due to the fact, that the medium is colder than the volume, but also because of a change in the properties of thermal conductivity in the volume, meaning that heat is conducted to the sides of the storage where it can be released into the air surrounding the heat storage by convection and evaporation.

The piping can be realized with various materials. For an input system, one could use a system like the micro-drip-system from gardena. Alternatively a drainage pipe used for foundations in the construction business can be used.

For an open or closed system one could use any material for the piping, e.g. metal, plastic (hard or flexible) or stone ware. Systems used for underfloor heating can be applied. Concerning the source of water as medium in an input or open system one could connect the piping directly to the tap. Alternatively the water could be pumped from a nearby water source (e.g. groundwater, lake or river). For both systems one need to be sure that the water quality is high enough to be released in the environment.

The cooling system can be operated in different modes. It can be turned on and off by the operator; it can be turned on and off automatically, if a certain mode (e.g. charging mode of the heat exchange system) is active; it can be turned on and off automatically, if a certain temperature is reached; it can be turned on and off, after a certain period of time. The flow in the pipes can be feedback controlled.

BRIEF DESCRIPTION

Some of the embodiments will be described in detail, with reference to the following figures, wherein like designations denote like members, wherein.

DETAILED DESCRIPTION

Figure 1:
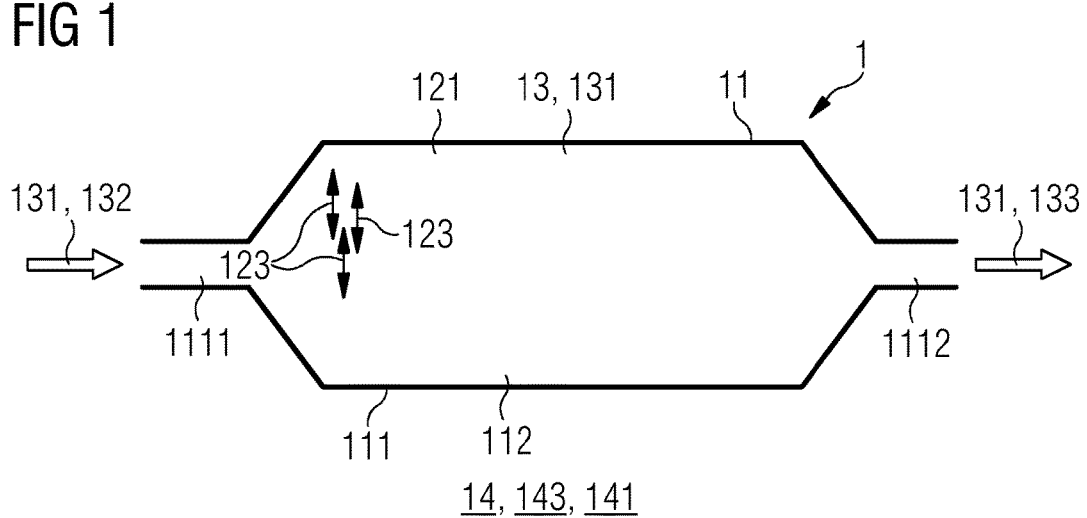
FIG. 1 shows a heat exchange chamber of the heat exchange system, in accordance with embodiments of the present invention.

FIG. 1 depicts a heat exchange chamber of the heat exchange system, in accordance with embodiments of the present invention. Embodiments of the invention refer to a heat exchange system 1 with a horizontal heat exchange chamber 11 on a high temperature level.

With the aid of the proposed heat exchange system 1, thermal energy can be stored on a high temperature level during the charging mode. This stored thermal energy can be used during the discharging mode for the production of steam in a water steam cycle for reconversion into electrical energy.

The heat exchange system 1 comprises at least one heat exchange chamber 11 with heat exchange chamber boundaries 111 which surround at least one heat exchange chamber interior 112 of the heat exchange chamber 11.

The heat exchange chamber boundaries 111 comprise at least one first opening 1111 for guiding in an inflow 132 of at least one heat transfer fluid 131 into the heat exchange chamber interior 112 and at least one second opening 1112 for guiding an outflow 133 of the heat transfer fluid 131 out of the heat exchange chamber interior 112. At least one heat storage material 121 (sand or stones) is arranged in the heat exchange chamber interior 112 such that a heat exchange flow 13 of the heat transfer fluid 131 through the heat exchange chamber interior 112 causes a heat exchange between the heat storage material 121 and the heat transfer fluid 131.

Exemplarily, the heat exchange chamber length of the horizontal heat exchange chamber 11 is about 200 m, the heat exchange chamber height of the heat exchange chamber 11 is about 10 m and the heat exchange chamber width of the heat exchange chamber is about 50 m.

For the avoidance of heat transfer to the underground (soil) a cooling device is arranged between the heat exchange chamber and the soil beneath the heat exchange chamber.

Concerning a first example, the cooling device comprises wet sand. The cooling fluid is water.

Concerning a second example, the cooling fluid is air.

Figure 2:
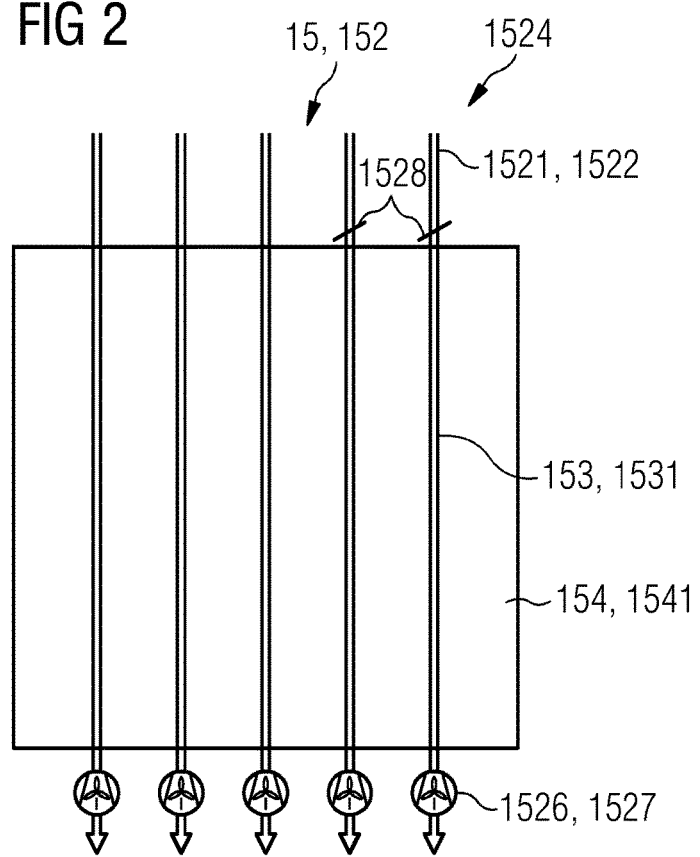
FIG. 2 shows a first embodiment of a cooling device.
Figure 3:
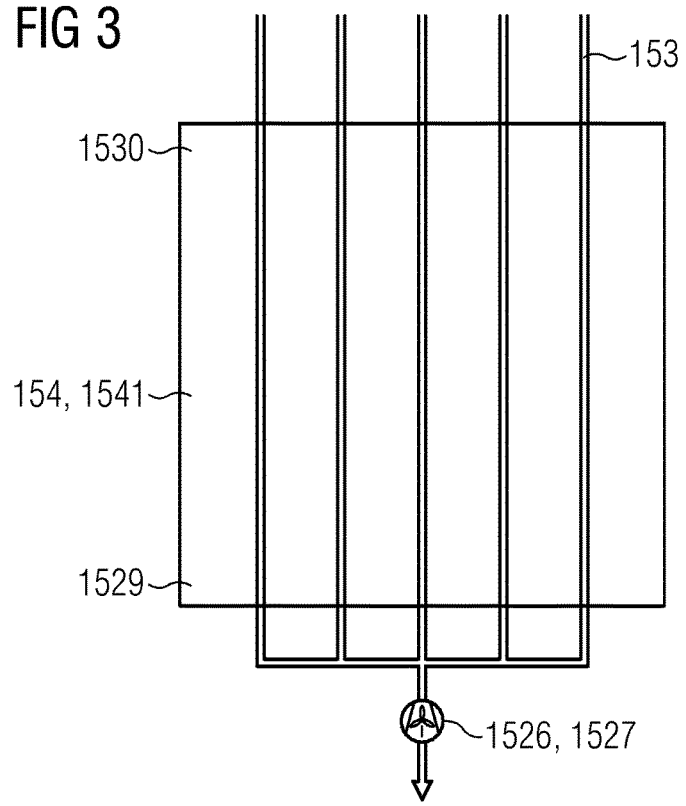
FIG. 3 shows a second embodiment of a cooling device.
Figure 4:
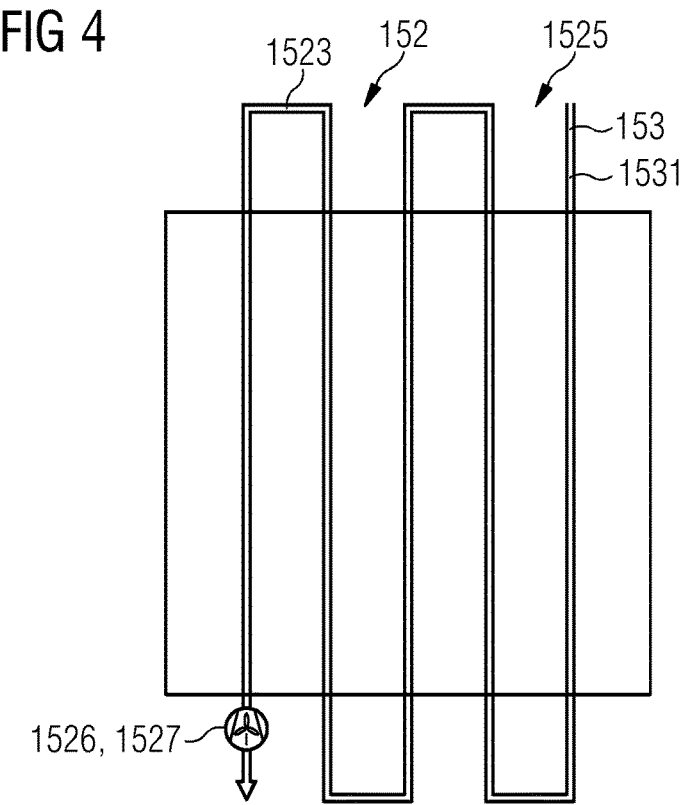
FIG. 4 shows a third embodiment of a cooling device.

FIGS. 2 to 4 show details of the cooling device. The cooling device concerning FIG. 2 comprises independent piping cycles. FIG. 3 shows cooling pipes which are connected just on a hot side 1529 of the cooling device 15. The piping cycle are not connected at the cold side 1530 of the cooling device. Concerning FIG. 4 the cycles are connected to act as one cooling pipe. The cooling fluid is sucked in both directions.

For the guiding of the cooling fluid an active fluid motion device 1527 is used for adjusting the flow 1531 of the cooling fluid 153 trough the piping system 152. This active fluid motion device is a fan. Additionally, valves as passive fluid control devices 1528 can be used.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A heat exchange system, comprising:
   at least one horizontal heat exchange chamber with heat exchange chamber boundaries which surround at least one heat exchange chamber interior of the at least one horizontal heat exchange chamber, wherein:
   the heat exchange chamber boundaries comprise at least one first opening for guiding in an inflow of at least one heat transfer fluid into the at least one heat exchange chamber interior and at least one second opening for guiding out an outflow of the at least one heat transfer fluid out of the at least one heat exchange chamber interior;
   at least one heat storage material is arranged in the at least one heat exchange chamber interior such that a heat exchange flow of the at least one heat transfer fluid through the at least one heat exchange chamber interior causes a heat exchange between the at least one heat storage material and the at least one heat transfer fluid;
   the at least one horizontal heat exchange chamber is located at a soil area of a soil; and
   at least one cooling device is arranged between the at least one horizontal heat exchange chamber and the soil for inhibiting a heat transfer from the at least one horizontal heat exchange chamber to the soil;
wherein the heat exchange system is equipped with at least one discharging unit for discharging the at least one heat transfer fluid of the outflow from heat for production of electricity.

2. The heat exchange system according to claim 1, wherein the at least one horizontal heat exchange chamber is located on the soil area and the at least one cooling device is located beneath the at least one horizontal heat exchange chamber.

3. The heat exchange system according to claim 1, wherein the soil area is formed by at least one soil excavation of the soil.

4. The heat exchange system according to claim 1, wherein the at least one cooling device comprises at least one piping system with at least one cooling duct for piping at least one cooling fluid.

5. The heat exchange system according to claim 1, wherein the at least one cooling device comprises at least one solid heat absorbing material.

6. The heat exchange system according to claim 5, wherein the solid heat absorbing material comprises sand.

7. The heat exchange system according to claim 4, wherein the at least one piping system comprises at least one open piping cycle and/or at least one closed piping cycle.

8. The heat exchange system according to claim 4, wherein the at least one piping system comprises at least one parallel arrangement of at least two of the piping cycles and/or a serial arrangement of at let two of the piping cycles.

9. The heat exchange system according to claim 4, wherein the at least one piping system is equipped with an at least one flow adjusting element for adjusting a flow of the cooling fluid trough the at least one piping system.

10. The heat exchange system according to claim 9, wherein the at least one flow adjusting element comprises at least one active fluid motion device which is selected from the group consisting of: a blower, a fan and pump, and/or the at least one flow adjusting element comprises at least one passive fluid control device which is selected from the group consisting of: an activatable bypass pipe, a nozzle, a flap, a damper and a valve.

11. The heat exchange system according to claim 1, wherein the at least one discharging unit comprises at least one steam cycle.

12. A method for exchanging heat by using the heat exchange system according to claim 1, wherein in an operating mode of the heat exchange system a heat exchange flow of heat transfer fluid is guided through the at least one heat exchange chamber interior, whereby a heat exchange between the at least one heat storage material and the at least one heat transfer fluid is caused.

13. The method according to claim 12, wherein the operating mode is selected from the group consisting of: a charging mode with a heat transfer from the heat transfer fluid to the at least one heat storage material and a discharging mode with a heat transfer from the at least one heat storage material to the at least one heat transfer fluid.

* * * * *